Patented Sept. 20, 1932

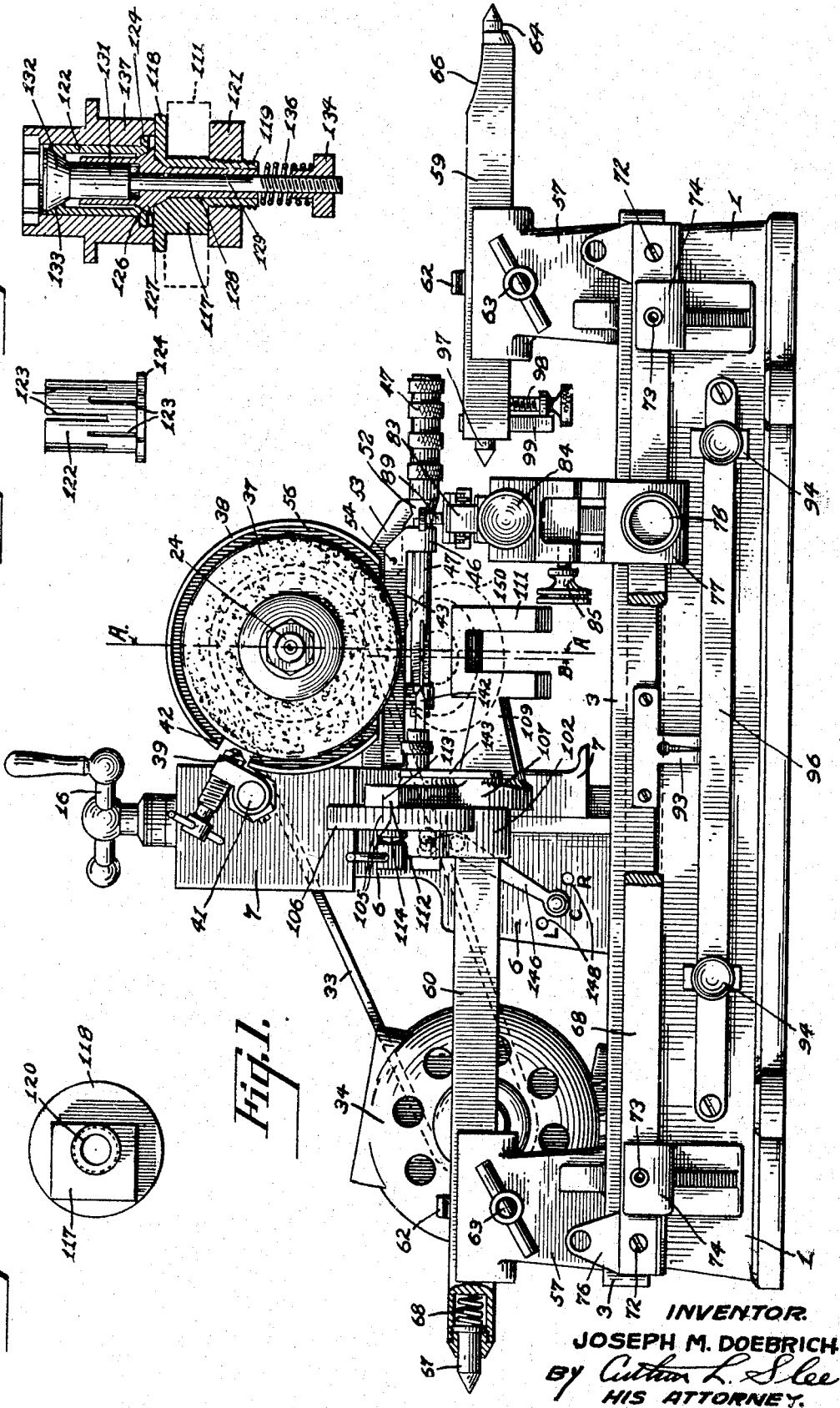

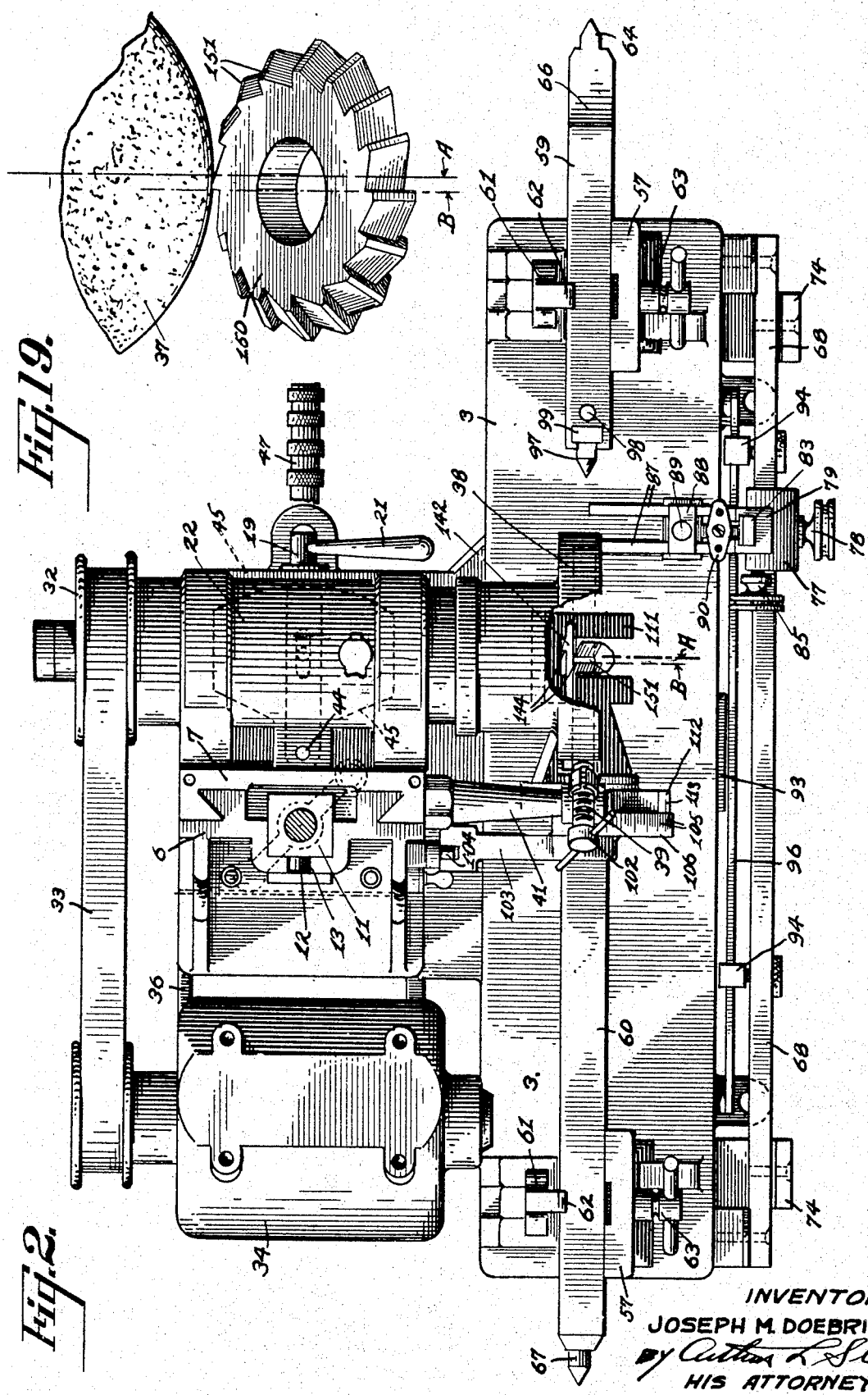

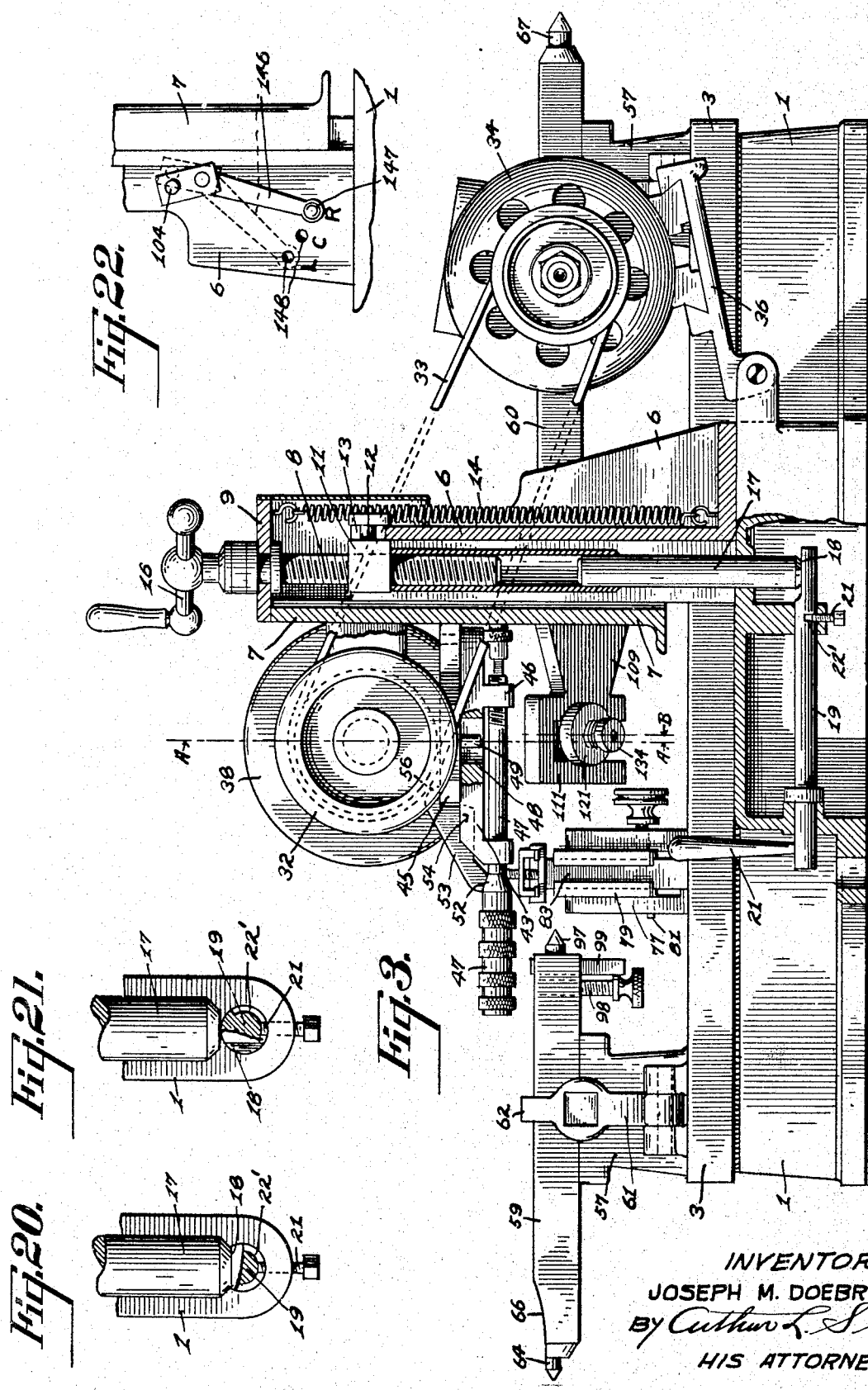

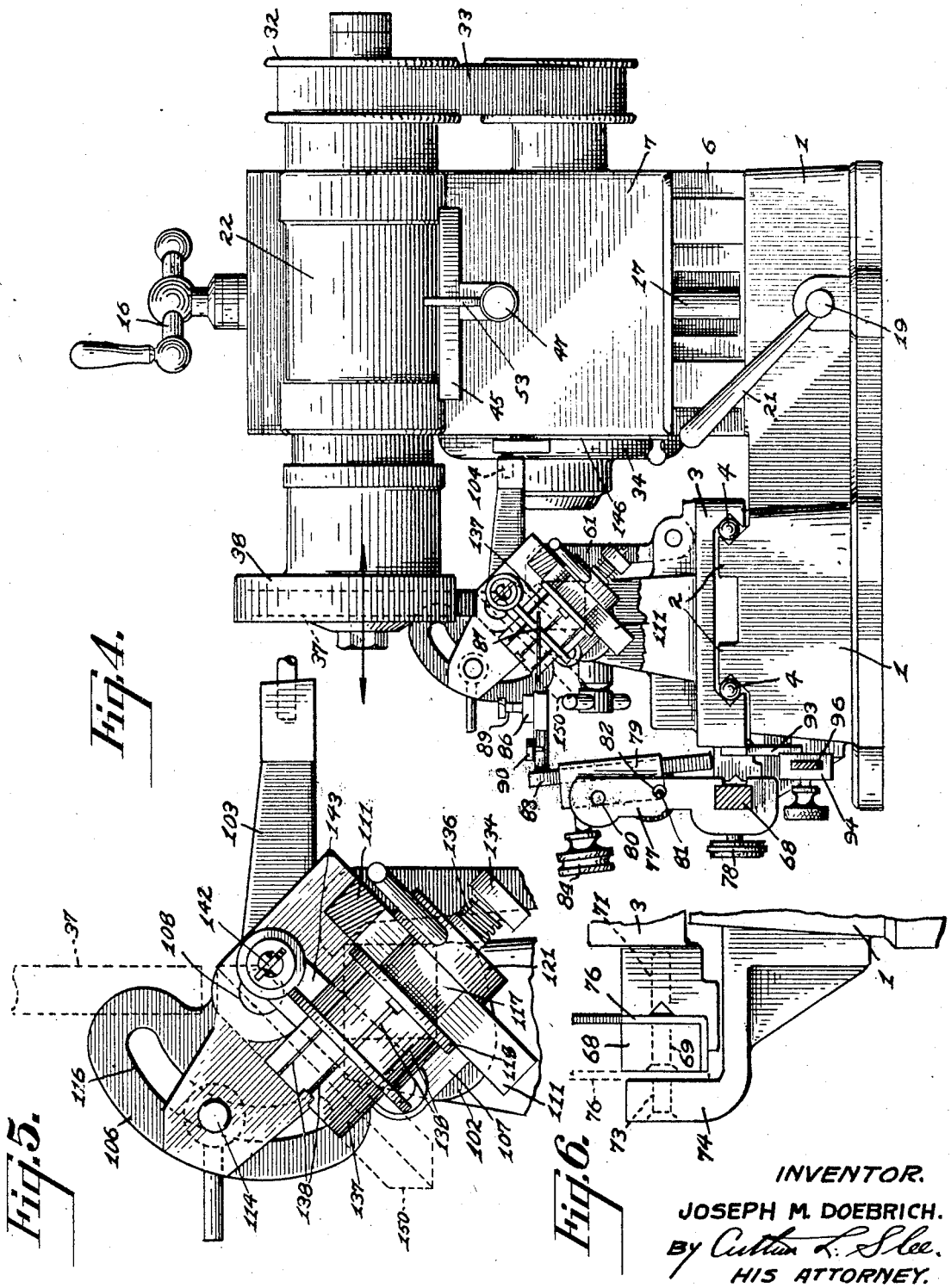

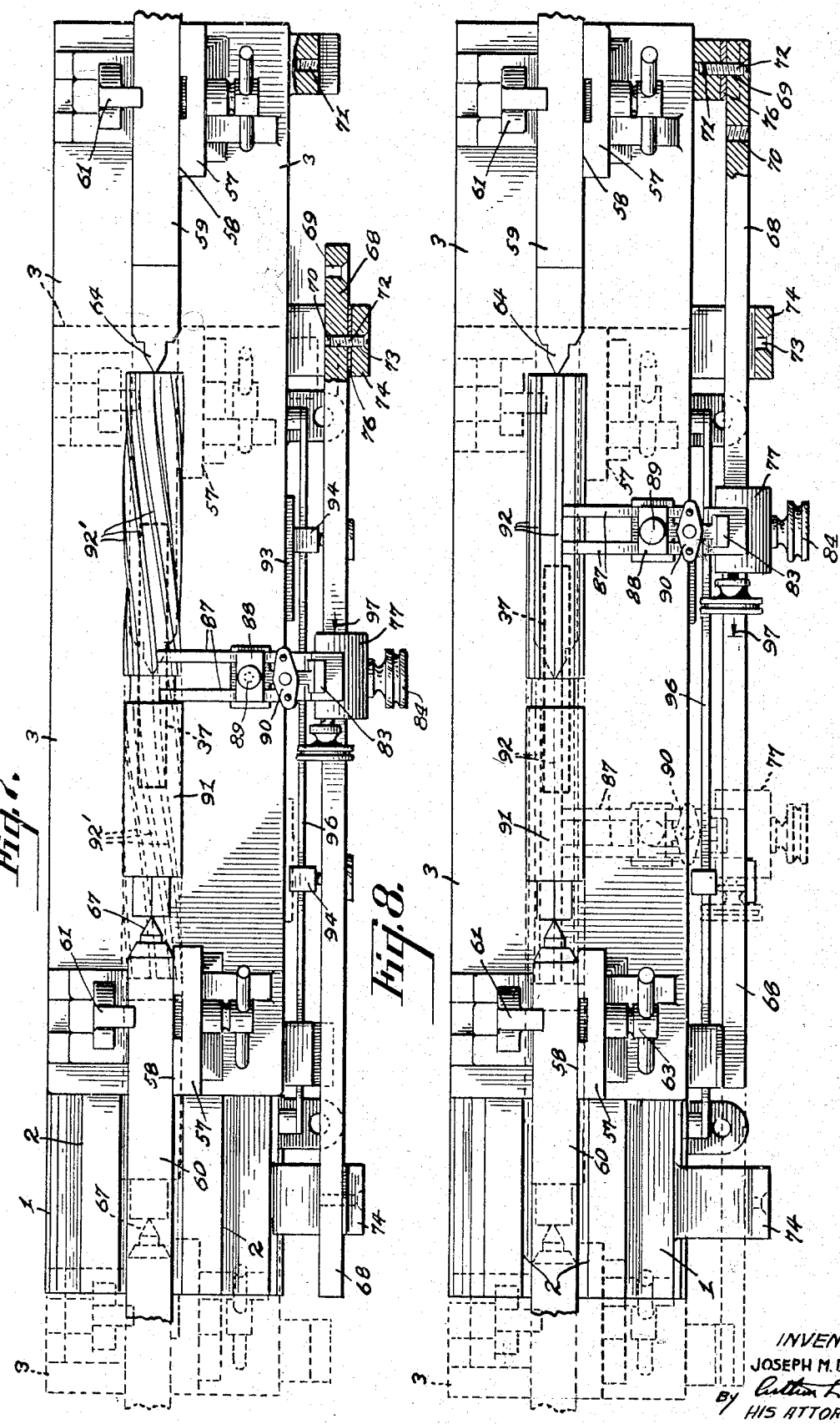

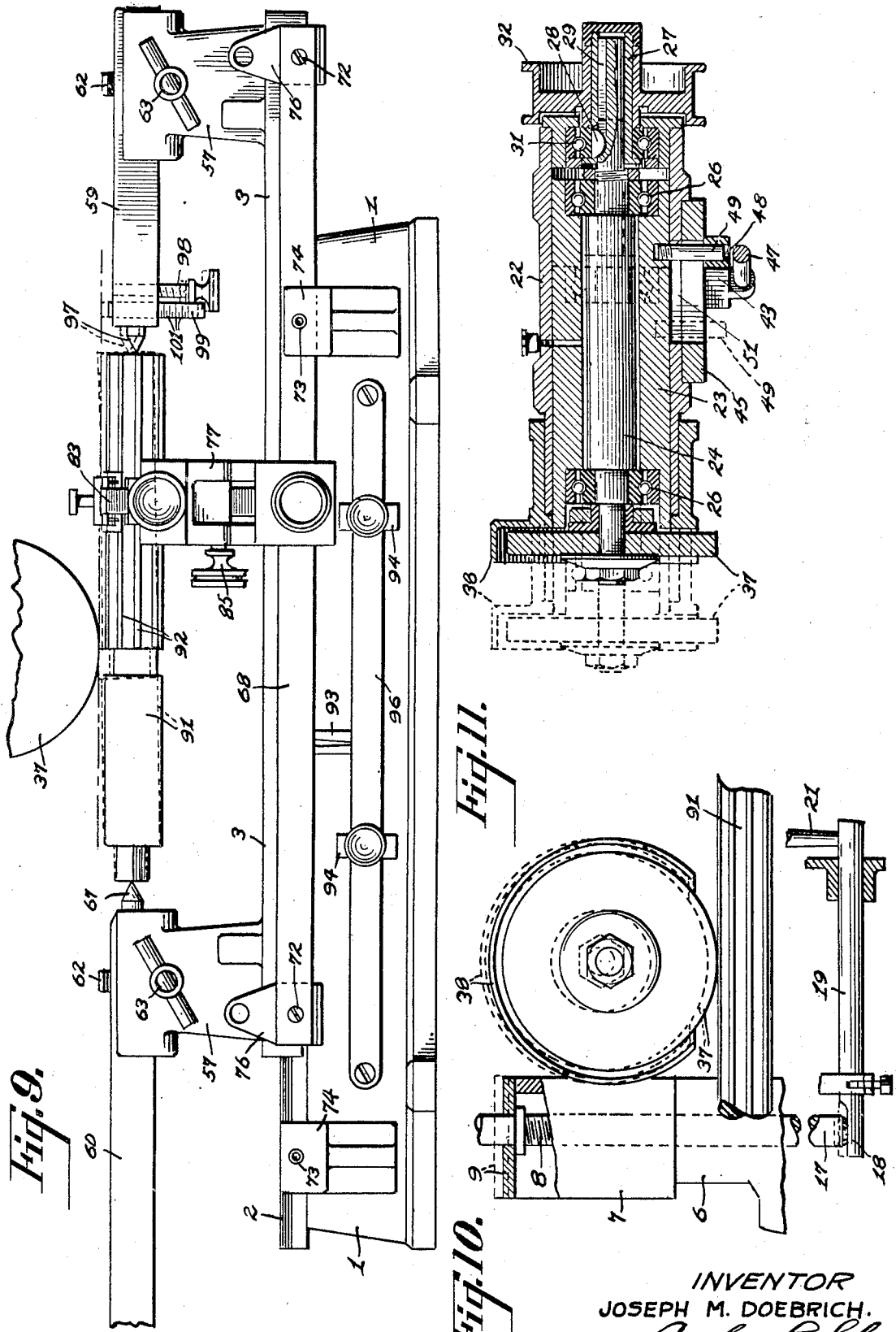

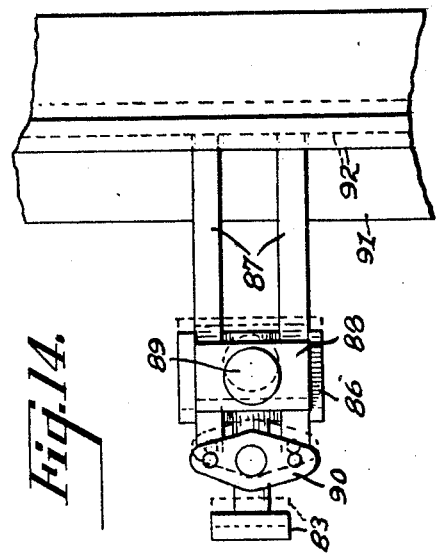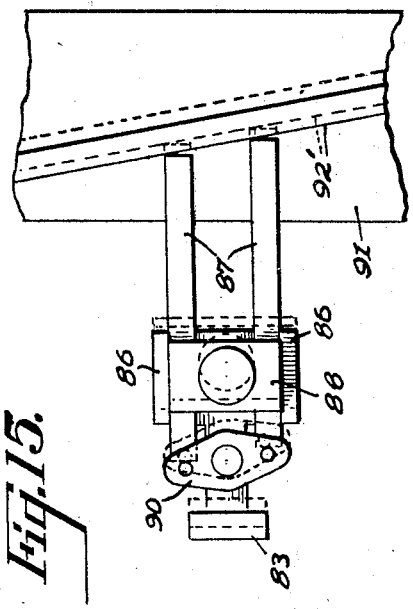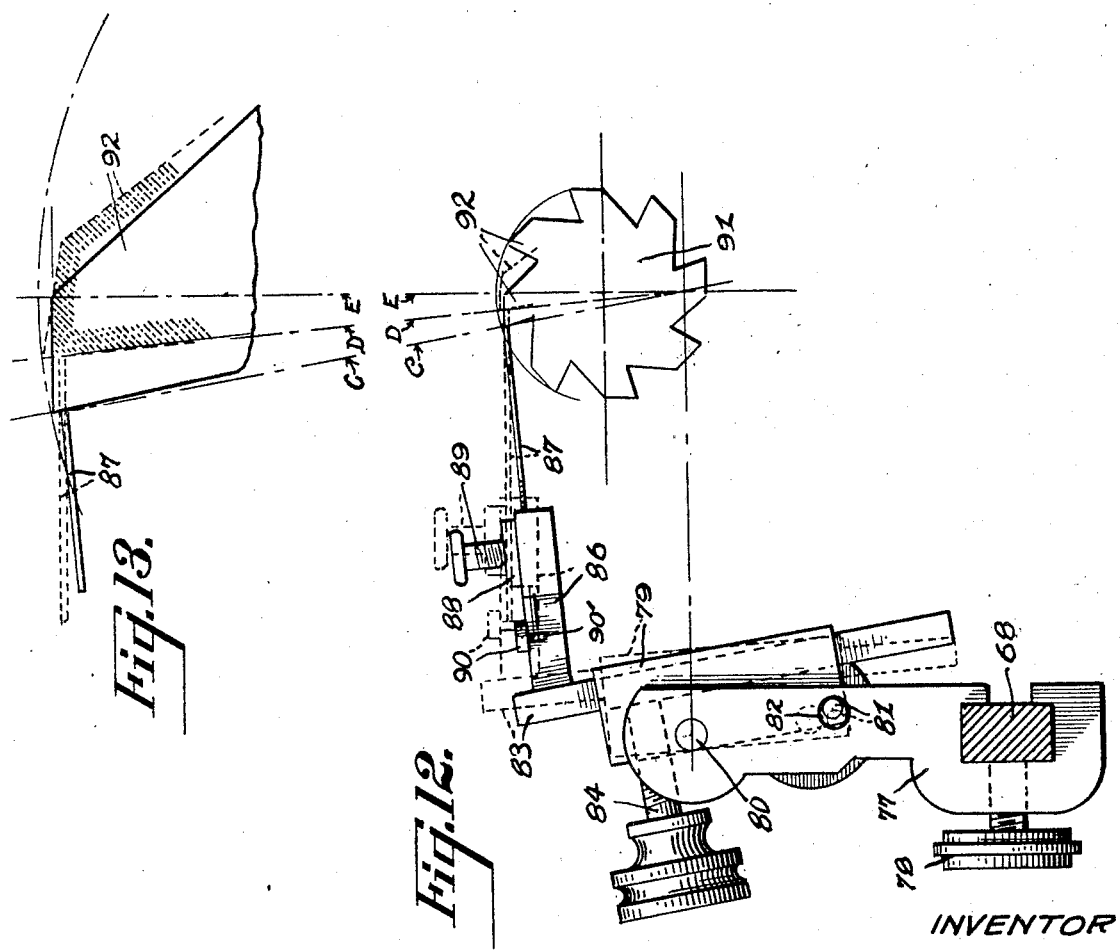

1,878,385

UNITED STATES PATENT OFFICE

JOSEPH M. DOEBRICH, OF TUCSON, ARIZONA

TOOL GRINDING MACHINE

Application filed February 10, 1930. Serial No. 427,203.

My invention relates to improvements in tool grinding machines for grinding cutting tools such as reamers, milling cutters, and the like, wherein a tool to be ground is supported and accurately set and guided in correct grinding relation to a grinding wheel to grind the cutting teeth of such tool at a proper angle.

The primary object of my invention is to provide an improved tool grinding machine.

A further object is to provide an improved grinding machine adaptable for use in grinding tools of a variety of forms and which will facilitate the adjustment of the machine to various sizes and shapes of cutting tools.

A further object is to provide an improved device wherein the teeth of a tool to be ground may be quickly and accurately set and held in proper angular relation to a grinding wheel for grinding.

Another object is to provide an improved machine wherein the teeth of a tool may be set and guided in different fixed angular relations to a grinding wheel to make proper backing off and finishing cuts, each angular relation being positively determined independently of the size of the cutting tool to be ground.

A further object is to provide an improved guide means adaptable for use with either straight or spiral toothed reamers and the like.

A further object is to provide an improved mounting means for milling cutters whereby cutters of various sizes and shapes may be supported in accurately adjusted relation to a grinding wheel.

Another object is to provide an improved machine of the character described, provided with tool mounting means arranged to receive right or left hand cutters as desired and wherein the teeth of such cutters are held in offset relation to a vertical plane through the axis of a grinding wheel to grind said teeth at a proper angle.

A further object is to provide an improved machine wherein a tool to be ground may be accurately positioned for an initial backing off cut and a subsequent finishing cut, each cut being made at a proper angle.

A further object is to provide an improved grinding machine having improved means for moving and guiding a tool past a grinding wheel and also provided with improved means for moving the wheel relative to a cutting tool held in fixed position as desired.

A further object is to provide an improved means for adjusting a tool for grinding at a desired taper.

Another object is to provide an improved grinding head adapted to prevent vibration and adjustable to desired positions.

A further object is to provide a grinding head slidably movable relative to a tool to be ground and provided with means for raising the grinding wheel to an inoperative position independently of the adjusting means.

A still further object is to provide an improved grinding mechanism embodying improved features of construction facilitating the adjustment and operation of the machine and obtaining a simple and efficient operation.

I accomplish these and other objects by means of the improved device disclosed in the drawings forming a part of the present application wherein like characters of reference are used to designate similar parts throughout the specification and drawings, and in which—

Fig. 1 is a front elevation of my improved grinding machine;

Fig. 2 is a plan view of the machine, the cover plate of the grinding head carrier being removed;

Fig. 3 is a back elevation, partly in section, of the machine;

Fig. 4 is an end elevation of the machine, parts being broken away;

Fig. 5 is an end view of the milling cutter mounting means, the figure being drawn upon a larger scale;

Fig. 6 is an enlarged detail of the guide bar mounting means;

Fig. 7 is a plan view of the table and tool mounting means showing the manner in which the same is operated for grinding a spiral toothed reamer;

Fig. 8 is a view similar to Fig. 7 and showing the manner in which the device is operated for grinding a straight toothed reamer;

Fig. 9 is a broken front elevation showing the manner in which the machine operates to grind a taper;

Fig. 10 is a broken detail showing the manner in which the grinding head and grinding wheel as raised to inoperative position;

Fig. 11 is a vertical section of the grinding head;

Fig. 12 is an enlarged detail view of the reamer guide;

Fig. 13 is a diagrammatic view showing the manner in which a tooth is shifted from an initial grinding position to a finishing position;

Figs. 14 and 15 are broken plan views of the reamer guide as applied to straight tooth and spiral tooth reamers respectively;

Fig. 16 is a bottom view of the milling cutter mounting block;

Fig. 17 is a side elevation of an expandible cutter mounting sleeve;

Fig. 18 is a sectional detail of the cutter mounting assembly and expanding means;

Fig. 19 is a front view of a milling cutter in operative relation to the grinding wheel;

Figs. 20 and 21 are broken detail views of the grinding head lifting means; and

Fig. 22 is a broken enlarged detail of the cutter mounting shifting means.

Referring to the drawings, the numeral 1 is used to designate in general a base provided with a track 2. A table 3 is slidably mounted upon the track 2, said table being supported upon suitable anti-friction rollers 4. The base is provided with a rearwardly disposed extension having an upwardly extending grinder head support 6.

A carrier 7 is mounted upon the support 6, said carrier being adjustable vertically along the support by means of a threaded member 8 rotatably secured upon a cover plate 9 secured upon the top of the carrier and engaging a nut 11 mounted upon the top of the support. A lateral extension 12 carried by the nut 11 engages a notch 13 formed in the support 6 to normally hold said nut against rotation. A spring 14 connected at its upper end to the carrier 7 and at its lower end to the base 1 normally moves the carrier downwardly toward the top of the support, the carrier being raised or lowered by turning the threaded member 8 in a proper direction by means of a handle 16 secured upon the upper end of said member 8.

The nut 11 is provided with a downwardly disposed extension 17 welded thereto and having its lower end engaging a cam 18 carried by a shaft 19 mounted upon the base 1 and arranged to be turned by means of a lever 21. The cam 18 forms a seat limiting the downward movement of the nut relative to the top of the support 6 and when the cam is turned through an angle of substantially ninety degrees from the normal position shown in Fig. 20 to the lifting position shown in Fig. 21, the nut 11 is raised, thereby moving the carrier 7 upwardly against the tension of the spring 14. The rotative movement of the shaft 19 and cam 18 is limited by a set screw 21 engaging a circumferential groove 22' formed in the shaft, said set screw also serving to prevent axial movement of the shaft relative to the base 1. The upward movement of the nut 11 and carrier 7 by the cam 18 does not affect the relative positions of said nut and carrier to each other as adjusted by the threaded member 8.

A bearing shell 22 is rigidly fixed to the carrier 7 with its axis horizontally disposed. A bearing block 23 is slidably mounted within the shell 22 and a grinding head shaft 24 extends axially through the bearing block 23. The shaft 24 is supported by suitable anti-friction bearings 26 set within recesses formed at the ends of the bearing block 23, the bore of said block being slightly larger than the shaft to provide a slight clearance. The bearings 26 support the shaft at spaced points and the clearance around the shaft within the block accommodates a heavy film of oil. I have found that this method of mounting the shaft 24 is particularly effective for reducing vibration and chattering of the grinding wheel.

A driving sleeve 27 is feathered onto the rearward end of the shaft 24 by means of a suitable key 28 slidably engaged by a keyway 29 formed in the end of the shaft. An anti-friction bearing 31 is mounted upon the sleeve and supported within the rearward end of the shell 22. A driving pulley 32 is secured upon the sleeve 27 to receive a belt 33 driven by a motor 34 mounted upon the base 1. The motor 34 is preferably secured upon a motor mounting plate 36 pivotally mounted upon the base 1, the weight of said motor causing the plate 36 to be swung downwardly to maintain a driving tension upon the belt 33.

A grinding wheel 37 is secured upon the forward end of the shaft 24. The wheel 37 preferably partially enclosed by a shroud 38. A dressing tool 39 is mounted upon an extension 41 carried by the carrier 7, said tool 39 being movable to engage the edge of the wheel 37 through an opening 42 formed in the shroud whereby the wheel may be dressed when necessary.

A lever 43 is pivotally connected at one end of the carrier 7, as at 44, upon the under side of a bracket 45 connected to the carrier 7 and to the shell 22. The lever 43 is provided with a pair of lugs 46 engaging a lever handle 47 threaded into one of said lugs whereby the handle may be moved axially relative to the lever. A slot 48 is formed in the lever 43 to slidably engage a pin 49 secured to the bearing block 23 and extending through a slot 51 in the shell 22 and bracket 45 whereby the block 23 and shaft 24 may be moved axially within the shell 22 by means of a pivotal movement of the lever 43.

The handle 47 is provided with a beveled shoulder 52 arranged to engage a clamping member 53 pivotally mounted upon the shell 22, as at 54. The member 53 is provided with an extension 56 arranged to be moved into clamping engagement with the outer edge of the bracket 45. When the handle 47 is turned to advance through the threaded lug, the shoulder 52 forces the member 53 into clamping engagement with the bracket thereby locking the lever 43 against pivotal movement and in that manner locking the bearing block and shaft 24 against axial movement.

The table 3 is provided with upwardly disposed brackets 57 adjacent the ends of the table. The upper ends of the brackets are recessed as at 58 to receive and engage centers 59 and 60 mounted thereon. Center clamping members 61 are pivotally mounted upon the brackets 57 and are provided with extensions 62 movable to engage and clamp the centers in the recesses 58. The members 61 are actuated by suitable screws 63 mounted upon the brackets 57 and engaging said member 61 whereby the centers may be clamped in desired adjusted positions. The centers 59 and 60 are preferably square in cross section and the recesses 58 are formed in the form of a right angle engaging two sides of the respective centers. The extensions 62 engage the corners of the centers diagonally opposite the recesses 58, thereby clamping the centers into contact with both surfaces of the recesses to insure accurate alinement of the centers.

The center 59 is provided with a rigid center point 64 adapted to engage and center one end of a reamer, or the like, to be ground, the upper surface of the center being cut away as at 66 to afford clearance for the grinding wheel 37. The center 60 is provided with a center point 67, said point preferably being slidably mounted co-axially with the center and normally being held in outwardly extending position by a spring 68, to engage the opposite end of the tool. The spring exerts a yielding pressure whereby the tool is accurately centered and at the same time permits said tool to be rotated between the points 64 and 67.

A guide mounting bar 68 is mounted parallel to the front of the table 3. The bar 68 is provided with spaced apertures 69 and 70 at each end thereof. The apertures 69 are arranged to register with apertures 71 formed in the table, said apertures 71 being tapped to receive securing screws 72. The apertures 70 are tapped to receive the same or similar screws 72 and are arranged to register with apertures 73 formed in forwardly disposed extensions 74 formed upon the base 1. By applying the screws 72 through the apertures 69 and into the tapped apertures 71 the bar is rigidly secured to the table 3 and is movable therewith. By removing the screws from the apertures 69 and applying them through the apertures 73 and into the tapped apertures 70, the bar is rigidly secured to the base 1 and the table is movable independently of the bar. Shims 76 are applied between the bar 68 and the surface to which the bar is secured, as shown in Fig. 6 of the drawings to maintain a proper clearance for the sliding movement of the table.

A guide supporting member 77 is mounted upon the bar 68, said member being provided with a securing member 78 whereby the supporting member may be secured in a desired position along said bar 68. A guide mounting member 79 is pivotally mounted at the upper end of the support 77, as at 80. A pin 81 is mounted upon the lower portion of the member 79 in spaced relation to the pivot 80, said pin being engaged within an elongated aperture 82 formed in the support to permit a limited pivotal adjustment of the member 79 relative to the support and being secured by a set screw 85. A slide 83 is adjustably mounted upon the member 79 and arranged to be secured in desired adjusted position by means of a clamping screw 84. The slide 83 is provided with a lateral extension 86 extending over the table 3, said extension having an enlarged outer end grooved to receive a pair of guide members 87. A clamping block 88 provided with a clamping screw 89 engaging the enlarged outer end of the extension 86 is operated by said screw to clamp the guide members 87 in operative adjustment upon said extension.

The guide members 87 consist of a pair of thin, flat fingers projecting from the extension 86 toward a tool supported by the centers 59 and 60. An equalizing bar 90 is pivotally mounted upon the extension 86, said bar 90 being provided with pins 90' arranged to engage the ends of the guide members 87 whereby a rearward movement of one of the guide members will cause the opposite guide member to be moved forward an equal amount. The guide members 87 are preferably held by the extension 86 at an angle of 87° from the slide 83. The slide 83 and mounting member 79 are inclined slightly from the vertical, said mounting member being pivotally movable from a position inclined preferably at 6° from the vertical to a position inclined 3° from the vertical, thus permitting the mounting member and slide to be moved through an angle of 3° and causing the guide member to be similarly shifted through an angle of 3° from an inclined position to a true horizontal position. This angular relation and shifting of the guide members and the mounting means therefor is illustrated in slightly exaggerated degree in Fig. 12 of the drawings.

The operation of the device as used for grinding reamers and tools of similar form is as follows: A reamer 91, having longitudinally disposed teeth 92, is mounted between the centers 59 and 60, the ends of the reamer being engaged by the points 64 and 67 as shown in Figs. 7 and 8 of the drawings, the centers being adjusted axially through their respective supporting brackets to obtain the proper spacing to receive the reamer. In the case of a reamer having straight teeth such as shown in Fig. 8, the guide bar 68 is secured to the table 3 by applying the securing screws 72 to engage the apertures 69 and 71, thereby causing the bar 68 to be movable with the table. The guide members 87 are then adjusted to engage the edge of the uppermost tooth 92 of the reamer.

The guide mounting member 79 is first set at its 6° inclination, as indicated in full lines in Fig. 12 of the drawings. In this position, the guide members 87 incline upwardly at an angle of 3° to a point spaced from a vertical plane through the axis of the reamer, the spacing being such that when the reamer is turned upon its axis to cause the uppermost tooth 92 to engage the ends of the guide members, the face of the tooth will be advanced approximately 6° from said vertical plane. This angle remains constant for reamers of all diameters. The reamer is turned upon its axis to cause the face of the tooth 92 to press against the ends of the guide members 87 while the clamping block 88 is loose, thereby causing said guide members to equalize their lengths and engage the tooth at spaced points. The clamping block is then tightened to hold the guide members in adjusted position whereby successive teeth of the reamer may be moved to grinding position against the ends of the guide members.

The pivot point 80 of the guide mounting member 79 is located at a point somewhat below the axis of rotation of the reamer, as best shown in Fig. 12 of the drawings. The distance below the axis of rotation is determined by the intersection of lines C and D with a vertical line E through the axis of the reamer. The line C is determined by the points to which the cutting edge of the teeth of the reamers of various diameters must be advanced to obtain the proper angle of clearance. As the angle of clearance is equal for all diameters of reamers, the angle through which the reamer must be turned to obtain this clearance necessarily decreases as the diameter of reamer is increased. Hence, the line C drawn through the cutting edges at their respective advanced positions intersects the vertical through the axis of the reamer at a point below the axis, as shown in Fig. 12, the relative angular advance of large and small diameters being indicated in Fig. 13 in direct relation to Fig. 12 of the drawings. The line D represents the position for the cutting edge of teeth of reamers of different diameters when moved to the position for the finishing cut. This line intersects the vertical line through the axis of the reamer at the same point as the line C.

The pivot 80 is positioned horizontally opposite the intersection of the lines C and D with the vertical line E, and the angular adjustment of the member 79 is such that the slide 83 will move parallel to the lines C or D according to the angular position of said member 79. In this manner, the ends of the guide members 87 will be moved along the lines C or D as desired to define the operative grinding positions for the teeth of reamers of any diameter within the range of the machine.

After the guide members 87 have been properly set, the grinding head is adjusted by means of the adjusting member 8 until the lower edge of the grinding wheel 37 will grind a desired depth of cut from the top of the uppermost tooth 92 of the reamer. The carrier 7 is then raised by means of the cam 18, as indicated in dotted lines in Fig. 10 of the drawings, to cause the wheel 17 to clear the reamer, and the bearing block 23 is then shifted axially by means of the lever 43 to a position directly over the tooth 92, the handle 47 being then tightened to clamp the block and the grinding wheel 37 in this position.

The table 3 is then moved to carry the reamer to one side of the wheel 37, as shown in full lines in Fig. 8 of the drawings, and the cam 18 is moved to lower the carrier 7 and grinding head to operative grinding position. The table is then moved to carry the reamer past the grinding wheel, as indicated in dotted lines in Fig. 8, said wheel being rotated by the motor 34, and the reamer being held with the upper tooth 92 against the guides 87 so that the top of the tooth will be ground uniformly along the entire length thereof to grind off a desired amount from the top of the tooth.

The angle at which the tooth is held causes a greater depth of cut to be made at the back of the tooth than is made at the front edge of the tooth, thereby "backing off" the tooth sufficiently to obtain the requisite clearance. The grinding head is preferably raised to inoperative position while the table is moved back to the starting point and the reamer turned manually to move the next successive tooth into operative grinding position, the grinding operation being repeated for each successive tooth until all the teeth have been ground.

The guide members 87 have sufficient spring resilience to permit the ends of said members to be sprung outwardly and permit the movement of the teeth upwardly past the ends of the guide member, when the reamer is turned upon its axis, and to spring back into guiding position against the face of the tooth as the tooth clears the guide members.

The longitudinal movement of the table 3 upon the base 1 is limited by a stop 93 secured upon the front edge of the table 3 at substantially the middle thereof and engaged by adjustable stops 94 mounted upon a stop guide bar 96 secured upon the base 1.

In the case of reamers 91 having spiral teeth 92', as shown in Fig. 7 of the drawings, the guide mounting bar 68 is secured to the base 1 by inserting the securing members 72 into engagement with the apertures 70 and 73. The guide mounting member 79 is moved to a central position directly opposite the grinding wheel, the position of the member 79 being indicated by a pointer 97 marked upon the bar. The clamping block 88 is loosened to permit the guide members 87 to be adjusted to match the inclination of the spiral teeth, as indicated in Fig. 15 of the drawings. The grinding wheel is adjusted as for a straight tooth reamer and the table moved to carry the reamer past the grinding wheel 37 as above described. In this case, the grinding wheel engages the reamer midway between the guide member 87, at which point the tooth is positioned in the same relation to the grinding wheel as the straight tooth occupies when in grinding position as above described. In moving the table and reamer past the guide members and wheel, the reamer is turned to maintain the face of the tooth against the guides, thereby causing the spiral tooth to be ground uniformly along the full length thereof as in the case of a straight tooth.

After the initial or backing off cut has been ground, the guide mounting member 79 is shifted pivotally to its opposite extreme position as limited by the aperture 82 and as illustrated in dotted lines in Fig. 12 of the drawings, thereby causing the guide member 87 to be advanced to a position spaced only 3° in front of a vertical plane through the axis of the reamer. When now the teeth 92 of a reamer are moved to engage the guide member 87, the teeth are inclined at an angle such that only the front edge of each tooth is engaged by the grinding wheel, thereby grinding a finishing cut to produce a sharp cutting edge and at the same time leaving a substantial backing for the tooth without reducing the desired clearance. The finishing cut is ground in a manner identical with the first cut in the case of either a straight tooth or a spiral tooth. The shifting of a tooth 92, and the manner in which the backing off and finishing cuts are made, is diagrammatically illustrated upon an enlarged scale in Fig. 13 of the drawings. In this figure, the initial grinding position of the tooth is shown in full lines and the top of the tooth is ground off at the angle indicated in relation to the diameter of the cutter as indicated by the broken arcuate line. When the guide member is shifted, the tooth is shifted to the position indicated in dotted lines and the forward edge is ground to the shape shown in shade lines.

In the case of tapered reamers, or reamers tapered for a limited amount upon the end, a center point 97 is provided which is adjustable vertically to hold the adjacent end of a reamer offset from the opposite end. The point 97 is preferably mounted upon the center 59 at the end opposite the rigid point 64. The point 97 is moved vertically by means of an adjusting screw 98 mounted upon the center 59 and engaging a block 99 upon which the point 97 is secured. The block 99 is calibrated as at 101 to indicate the amount of offset from the line of the axis of the opposite center, the calibrations preferably being graduated in degrees of offset per unit of length of the reamer whereby the amount of adjustment necessary to produce a desired taper for a particular length of reamer may be readily calculated. For a full taper reamer, the point 97 is adjusted to give the desired taper and the guides 87 are adjusted to the teeth and the teeth are ground exactly as above explained for straight reamers, each tooth being ground with the backing off and finishing cuts uniformly along the full length of the reamer. If only the end of the reamer is to be tapered, the grinding wheel 37 is set as shown in Fig. 9 of the drawings so that the plane of cut will take off only a desired portion of each tooth at the tapered end, as indicated by the broken line in said figure.

For grinding milling cutters, valve seat cutters, and the like having angularly disposed cutting teeth, I provide a tool mounting mechanism whereby such a cutter may be adjusted and held in correct grinding relation to the grinding wheel. In the drawings, I have illustrated this mounting mechanism as applied upon the center 60 at the end opposite the center point 67, and forming a part of said center. The mounting mechanism comprises a head 102 secured upon the center 60 and provided with an arm 103 apertured to engage a stop 104 adjustably mounted upon the grinding head support 6 to fix the position of the center and the mounting mechanism relative to the grinding head. A sector 106 is formed upon the head and provided with calibrations 105 graduated in degrees of angular adjustment.

A mounting member 107 is pivotally mounted as at 108 upon the head 102, said member being provided with an extension 109 having a yoke 111 formed at the end thereof. An arm 112, formed upon the member 107, is provided with an index 113 and is arranged to indicate the angular adjustment of the member 107 upon the calibrations 105. A securing member 114 engages the arm 112 through a slot 116 formed in the sector 106 whereby the member 107 may be secured in a desired angular adjustment.

A mounting block 117 is mounted in detachable engagement with the yoke 111. The block 117 consists of a rectangular body having an annular flange plate 118 formed upon the upper end and a threaded extension 119 formed upon the lower end thereof, said plate and extension being offset relative to the center of the block body. A bore 120 is formed through the block 117, said bore extending through the extension 119 and through the plate 118. The body of the block 117 is received between the arms of the yoke 111 and is detachably secured thereto by means of a clamping plate 121 threaded onto the end of the extension 119. The block 117 is reversible upon the yoke 111 so that the bore 120 may be positioned in offset relation to the center of the yoke and upon either side of said center.

An expandible tool seat is mounted upon the block 117, said seat comprising a sleeve 122 having longitudinal splits 123 formed in both ends thereof. The lower end of the sleeve is provided with a flange 124 and an internal conic seat 126 arranged to seat upon a conic shoulder 127 formed upon a sleeve member 128 mounted within the bore 120. A stem 129 is mounted axially through the sleeve member 128, the upper end of said stem being provided with an enlarged portion 131 having a conic shoulder 132 engaging a conic seat 133 formed within the upper end of the sleeve 122. The lower end of the stem 129 is threaded to receive a nut 134 movable along the stem and bearing against a spring 136.

By tightening the nut 134 against the spring 136 a pressure is exerted which operates to move the shoulder 132 against the seat 133 to expand the upper split end of the sleeve 122. At the same time, the sleeve 122 is moved against the shoulder 127 to cause the lower end of the sleeve to be expanded. The ends of the sleeve 122 are expanded independently so that the sleeve may be expanded to fit a straight bore or a tapered bore. The sleeve 122 is made of a size adapted to fit the ordinary bore of cutting tools of the type mentioned.

For tools having a bore too large to be engaged by the sleeve 122, a bushing 137, having splits 138 cut in both ends thereof, is fitted onto the sleeve 122, the bushing being expandible at both ends to fit the bore of a tool to be sharpened.

A stop member 142 is mounted upon an arm 143 pivotally mounted upon the member 107, said member 142 being provided with a pair of spaced stop shoulders 144 disposed upon opposite sides of the member 142 and disposed in opposite directions, said stop shoulders being disposed upon opposite sides of a plane defined by the center line of the yoke 111 and being spaced from said plane an amount equal to the offset of the bore 120 from the center of the block 117. The member 142 is arranged to be turned to present either stop shoulder 144 into engagement with the teeth of a cutter mounted upon the sleeve 122 or bushing 137, one of said shoulders being faced to engage right hand cutter teeth, while the other shoulder is faced in the opposite direction to engage left hand cutter teeth.

The stop 104 is secured upon a lever 146 pivotally mounted upon the support 6 and provided with a handle 147 movable into engagement within any of a plurality of detents 148. The lever 146 is moved to normally engage the center detent designated "C" as shown in Fig. 1 of the drawings. When in this position a vertical plane through the center line of the yoke 11 coincides with a vertical plane defined by the axis of the grinding wheel 37, as indicated by the broken center line A—A in Fig. 1 of the drawings, and the axis of the sleeve 122 will be offset to the right or left of said plane according to whether the block 117 is set for a right or left hand cutter. The position of the axis for a right hand cutter is indicated by the light broken line "B" in Fig. 1 of the drawings.

In operation, a cutting tool 150 is mounted upon the sleeve 122 or bushing 137, the block 117 being positioned upon the yoke in accordance with whether the cutter is a right or left hand cutter, and the sleeve 122 being expanded to frictionally hold the cutter and permit the cutter to be manually rotated upon its axis. Assuming a right hand cutter, as indicated in Figs. 1, 2 and 19 of the drawings, the proper stop shoulder 144 is turned to engage the uppermost tooth 151 of the cutter and define its operative grinding position in alinement with the axis of the cutter and spaced an equal amount from the vertical plane A—A as indicated in Fig. 2. The mounting member 107 moved to an angular adjustment conforming to the angle of the cutting teeth of the cutting tool, thereby causing the uppermost tooth to be disposed in a horizontal plane and parallel to the grinding edge of the grinding wheel.

After the cutting tool has been properly adjusted, the grinding wheel is adjusted vertically to grind the desired amount from the top of the uppermost tooth, and when so adjusted, the wheel, driven at relatively high speed by the motor 34, is moved past the tooth by moving the lever 43 to move the bearing block 23 and shaft 24 axially as indicated in Fig. 11 of the drawings. After the grinding wheel has been moved to grind the first tooth, the cutter is turned manually to move said tooth away from the stop 144 and to move the next successive tooth to operative position, the stop member 142 being sprung sufficiently by the beveled back of each tooth to clear the tooth and engage the cutting face thereof to define its operative position. The grinding operation is then repeated for each successive tooth. The offset position at which each tooth is held results in causing the grinding wheel to engage the tooth along an upwardly curving portion of the wheel spaced sufficiently from the vertical diameter of the wheel to grind the top of the tooth at an angle adapted to give the desired clearance. The angle and clearance is substantially the same for cutters of all sizes, and as the angle and clearance is dependent upon the offset position of the axis of the cutter, a uniform angle is obtained.

After the teeth of the cutter have been ground as above described, the lever 146 is moved to engage the detent 148 marked R or L according to whether the cutter is a right or left hand cutter. Thus, for a right hand cutter, the lever 146 is moved from its normal center position to the position shown in full lines in Fig. 22 and for a left hand cutter the lever is moved to the position indicated in dotted lines. This movement shifts the stop 104 slightly and causes the axis of the sleeve 122 and cutter 150 to be shifted slightly nearer to the vertical plane A—A, the entire table and mounting means being shifted relative to the base and grinding head. The grinding wheel is then adjusted to take a desired cut from the top of the tooth along the front or cutting edge, and operated as above explained to grind the teeth of the cutter 150 successively. In this manner, the cutting edge is ground at an angle slightly less than the angle of the initial cut, and a tooth is formed of substantially the same form as illustrated in Fig. 13 in connection with the reamer teeth 92.

By forming the cutter head 102 and the mounting means associated therewith upon the center 60, the same center may be used for grinding either reamers or milling cutters by merely reversing the center upon its support. In like manner, the center 59 provides either a rigid or an adjustable center point by merely reversing the center, thus avoiding any need for separate accessories.

While I have illustrated and described only what I regard as the preferred embodiment of my invention, the specific details of construction and arrangement are, of course, subject to modification in a great number of ways without departing from the spirit of my invention. I therefore do not wish to restrict myself to the specific details disclosed, but desire to avail myself of all modifications which may fall within the scope of the appended claims.

Having thus described my invention, what I claim as new and desire to secure by Letters Patent is:

1. A tool grinding machine comprising a base; a grinding head provided with a grinding wheel mounted above the base; a work supporting table slidably mounted upon the base; means mounted upon the table to engage and support toothed tools to be ground, said table being movable to move a tool longitudinally past the grinding wheel; a guide bar mounted adjacent the table; a guide mounted upon the bar, said guide being provided with a pair of spaced arms extending into engagement with the teeth to define an operative position of each successive tooth in fixed angular relation to the plane of the grinding surface at the point of contact with the tool to grind an initial cut; means for adjusting the arms relative to each other and to the tool to conform to the longitudinal contour of the teeth of the tool; means for shifting the guide and arms to define a second operative position of each successive tooth in a different fixed angular relation to the plane of the grinding surface to grind a finishing cut; and means for shifting the center at one end of the tool to obtain a tapered grinding of the tool when moved longitudinally past the grinding wheel.

2. A tool grinding machine comprising a base; a grinding head provided with a grinding wheel mounted above the base; tool supporting means mounted adjacent the grinding wheel to receive a cutting tool to be ground, said means comprising a center bar, a yoke pivotally mounted upon said bar and having its arms equally spaced from opposite sides of a vertical plane through the axis of the grinding wheel, and means for securing the yoke in a desired angularly adjusted position relative to the center bar and the grinding wheel; a mounting member engaging the yoke and provided with an expandible bushing having its axis normal to the plane of the yoke and offset from the vertical plane, said member being reversible upon the yoke to space the bushing axis upon opposite sides of said plane to accommodate right or left hand cutting tools as desired; and a stop member adjustably mounted upon the mounting member and provided with oppositely facing stops disposed upon opposite sides of the vertical plane, said member being movable to position said stops in engagement with a tooth of right or left hand cutter tool to define an operative grinding position with the edge of said tooth offset a fixed amount from the vertical plane.

3. A tool grinding machine comprising a base; a grinding head provided with a grinding wheel mounted above the base; tool supporting means mounted adjacent the grinding wheel to receive a cutting tool to be ground, said means comprising a center bar, a yoke pivotally mounted upon said bar and having its arms equally spaced upon opposite sides of a vertical plane through the axis of the grinding wheel, and means for securing the yoke in a desired angularly adjusted position relative to the center bar and the grinding wheel; a mounting member engaging the yoke and provided with an expandible bushing having its axis normal to the plane of the yoke and offset from the vertical plane, said member being reversible upon the yoke to space the bushing axis upon opposite sides of said plane to accommodate right or left hand cutting tools as desired; and a stop member adjustably mounted upon the mounting member and provided with oppositely facing stops disposed upon opposite sides of the vertical plane, said member being movable to position said stops in engagement with a tooth of right or left hand cutter tool to define an operative grinding position with the edge of said tooth offset a fixed amount from the vertical plane; and means for shifting the mounting member a fixed amount to vary the degree of offset from the vertical plane.

4. In a grinding tool, a tool support comprising a bar having a center formed at one end and provided with a yoke pivotally mounted upon the opposite end; means for adjusting the yoke in a desired angular position relative to the support; a tool mounting member detachably engaging the yoke and provided with a pin having its axis normal to the plane of the yoke and offset laterally from the center line of the yoke, said member being reversible upon the yoke to position the axis of the pin upon either side of said center line to conform to right and left hand cutter tools; an exandible sleeve mounted upon the pin; means for expanding said sleeve to engage the bore of a cutting tool; and a stop member pivotally adjustable upon the mounting member and provided with oppositely disposed stops spaced equally upon opposite sides of a plane defined by the center line of the yoke an amount equal to the offset of the pin from said center line, said stop member being adapted to be sprung past the teeth of a cutting tool to permit successive teeth to be moved to operative grinding position in engagement with a stop of said member.

5. In a grinding tool, a grinding head comprising a rigid support; a carrier adjustable upon the support; screw means for adjusting the carrier relative to the support; a bearing shell mounted upon the carrier; a bearing block slidably mounted within the shell and having recesses at its ends; a shaft mounted axially through the bearing block, said block being bored to provide a slight clearance around the shaft; anti-friction rollers mounted within the recesses of the block and engaging the shaft; a grinding wheel secured upon one end of the shaft; a sleeve feathered upon the opposite end of the shaft; an anti-friction bearing mounted upon the sleeve and engaging the bearing shell; driving means connected to the sleeve for rotating said sleeve and the shaft; and means for moving the bearing block axially within the bearing shell for moving the grinding wheel to desired positions relative to the tools to be ground.

6. In a grinding tool, a grinding head comprising a rigid support; a carrier adjustable upon the support; screw means for adjusting the carrier relative to the support; a bearing shell mounted upon the carrier; a bearing block slidably mounted within the shell and having recesses at its ends; a shaft mounted axially through the bearing block, said block being bored to provide a slight clearance around the shaft; anti-friction rollers mounted within the recesses of the block and engaging the shaft; a grinding wheel secured upon one end of the shaft; a sleeve feathered upon the opposite end of the shaft; an anti-friction bearing mounted upon the sleeve and engaging the bearing shell; driving means connected to the sleeve for rotating said sleeve and the shaft; means for moving the bearing block axially within the bearing shell for moving the grinding wheel to desired positions relative to tools to be ground; and means for elevating the carrier independently of the screw adjusting means whereby the grinding wheel may be lifted out of engagement with a tool to be ground without altering the adjustment of the carrier.

7. In a grinding machine, the combination with a base, a grinding wheel mounted above the base, and a table slidably mounted upon the base below the grinding wheel, of a guide bar having a pair of spaced apertures formed adjacent each end, one aperture of each pair being positioned to register with an aperture formed in the base and the other aperture being positioned to register with an aperture formed in the table, said apertures being arranged to receive securing members whereby the bar may be secured in rigid fixed position upon the base or upon the table for sliding movement with said table relative to the base; and guide means adjustable upon the bar to engage the teeth of a cutting tool to be ground and to define the operative grinding position of successive teeth relative to the grinding wheel.

8. In combination, means for facing a tool having toothed cutters, means for supporting said tool for facing, and means for retaining said tool, first in one position during a face cutting operation by said facing means, and then in a second position for cutting of another face on said tool at a predetermined change in angular position of said tool whereby said cut faces are at a predetermined angle to each other.

9. In a combination with a tool facing means, guide means comprising a pair of spaced bars for engaging a tool face, means for mounting said bars for sliding movement, and means connecting said bars to transmit sliding movement of one of said bars to the other of said bars.

In witness whereof, I hereunto set my signature.

JOSEPH M. DOEBRICH.